(12) United States Patent
Sorenson, III

(10) Patent No.: US 12,254,346 B1
(45) Date of Patent: Mar. 18, 2025

(54) LATENCY SERVICE LEVEL AGREEMENT BASED SCHEDULING OF OPERATING SYSTEM THREADS AT CLOUD SERVICES

(71) Applicant: Amazon Technologies, Inc., Seattle, WA (US)

(72) Inventor: James Christopher Sorenson, III, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 457 days.

(21) Appl. No.: 17/808,075

(22) Filed: Jun. 21, 2022

(51) Int. Cl.
*G06F 9/44* (2018.01)
*G06F 9/48* (2006.01)

(52) U.S. Cl.
CPC .................. *G06F 9/4875* (2013.01)

(58) Field of Classification Search
CPC ....................................... G06F 48/75
USPC ......................................... 718/102
See application file for complete search history.

(56) References Cited

U.S. PATENT DOCUMENTS

| | | |
|---|---|---|
| 6,269,391 B1 | 7/2001 | Gillespie |
| 8,161,491 B2 | 4/2012 | Krishnakumar et al. |
| 8,762,997 B2 | 6/2014 | Moon et al. |
| 9,367,357 B2 | 6/2016 | Cadambi et al. |
| 10,255,217 B2 | 4/2019 | Pendharkar et al. |
| 10,542,100 B2 | 1/2020 | Kuchibhotla et al. |
| 2005/0015768 A1 | 1/2005 | Moore |
| 2013/0166750 A1* | 6/2013 | Moon ................. H04L 5/0058 709/226 |
| 2015/0067170 A1* | 3/2015 | Zhang ................ G06F 9/5072 709/226 |
| 2020/0110640 A1* | 4/2020 | Asthana ............. G06F 9/5077 |

OTHER PUBLICATIONS

Unknown, "Completely Fair Scheduler", Retrieved from https://www.kernel.org/doc/html/v5.17-rc8/scheduler/sched-design-CFS.html on May 11, 2022, pp. 1-6.
Jayant R. Haristsa et al, "Earliest Deadline Scheduling for Real-Time Database Systems", InThe Proceedings of the Real time Systems Symposium, 1991, pp. 1-11.
"Linux Programmer's Manual", Retrieved from https://man7.org/linux/man-pages/man7/sched.7.html on Apr. 13, 2022, pp. 1-20.
Muhammed Tawfiqul Islam, et al., "SLA-Based Scheduling of Spark Jobs in Hybrid Cloud Computing Environments," IEEE Transactions on Computers, DOI: 10.1109/TC.2021.3075625, May 2022, pp. 1-17.
Rizos Sakellariou, et al., "Job Scheduling on the Grid: Towards SLA-Based Scheduling," IOS Press Ebook vol. 16, pp. 207-222.

(Continued)

*Primary Examiner* — Timothy A Mudrick
(74) *Attorney, Agent, or Firm* — Robert C. Kowert; Kowert, Hood, Munyon, Rankin & Goetzel, P.C.

(57) ABSTRACT

A response initiation time target based at least in part on a service level agreement is assigned to a task requested from a network-accessible service. A deadline parameter of a thread identified to perform sub-tasks of the task at a service logic implementation node is set based on the target. The thread is scheduled for execution using an operating system thread scheduling algorithm which selects threads for execution based on their deadline parameters. After a first sub-task of thread is completed, a response is sent to the requester of the task.

20 Claims, 9 Drawing Sheets

(56) References Cited

OTHER PUBLICATIONS

Animesh Kuity, et al., "Advanced Reservation based SLA for Resource negotiations in Grid Scheduling," Proc. of the Intl. Conf. on Advances in Computer, Electronics and Electrical Engineering, Copyright © 2012 Universal Association of Computer and Electronics Engineers, pp. 399-402.

M. Lavanya, et al., "Multi objective task scheduling algorithm based on SLA and processing time suitable for cloud environment," ScienceDirect, vol. 151, Feb. 2020, pp. 183-195.

* cited by examiner

LATENCY SERVICE LEVEL AGREEMENT BASED SCHEDULING OF OPERATING SYSTEM THREADS AT CLOUD SERVICES

BACKGROUND

Many applications and services are increasingly being implemented using resources of cloud computing environments. In some cases, such services have to process requests for tasks from hundreds of thousands or even millions of clients concurrently using a distributed collection of nodes. For some types of tasks, service level agreements regarding the latencies that a client should expect may be provided. Managing stringent latency needs in such large-scale distributed systems can present a challenge.

Figure 1:
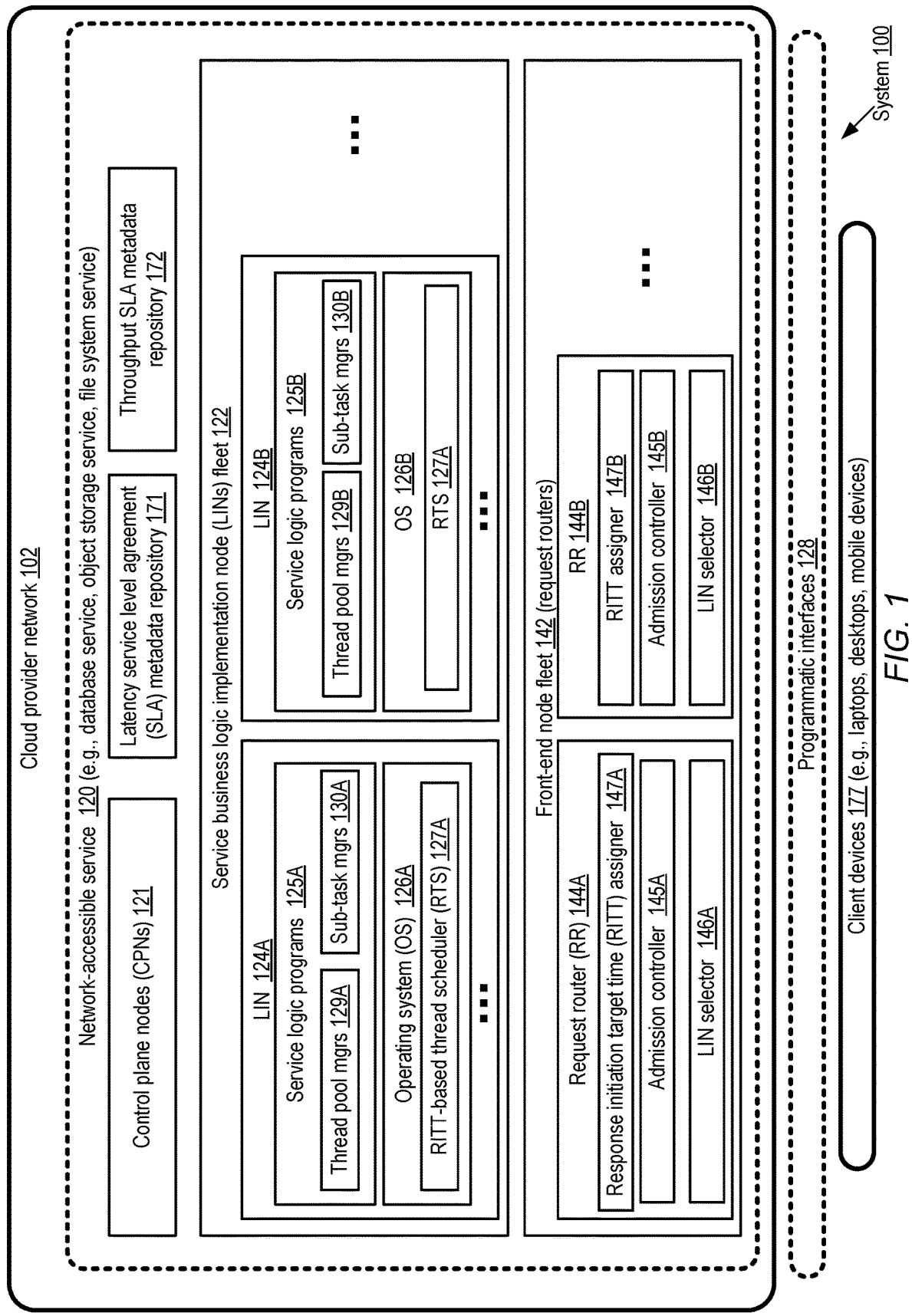
FIG. 1 illustrates an example system environment in which threads assigned to perform tasks on behalf of clients of cloud provider network services may be scheduled for execution at processors of service business logic implementation nodes based at least partly on latency service level agreements, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof. Unless otherwise explicitly stated, articles such as "a" or "an" should generally be interpreted to include one or more described items throughout this application. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

DETAILED DESCRIPTION

The present disclosure relates to methods and apparatus for scheduling threads, at the operating systems of back-end servers used for processing customer requests directed to cloud-based services, taking latency service level agreements (SLAs) of the services into account when making the scheduling decisions. Some network-accessible services implemented at cloud provider networks, such as high-end database services, distributed file system services, object storage systems and the like, may provide very high levels of throughput and responsiveness for tasks requested by customers. Such network-accessible services may offer various types of service level agreements to their customers, so that customers have full visibility into the performance and availability they can expect for various types of task requests. In some cases, the customers or clients of the services may choose from several tiers of performance, for which the service may for example require respective levels of payment. Performance-related service level agreements may for example cover the latency or response times that the service can provide for tasks (an example latency SLA may in effect state the equivalent of "at least 99% of the requests for tasks of type T1 will be processed within NI milliseconds"), and/or request rates or throughputs that can be supported by the service (an example throughput SLA may in effect state that "averaged over at least 99% of any time period greater than P seconds, the service will support at least Q requests/second of type T1").

To handle throughput related SLAs, network-accessible services can implement various types of request throttling or admission control techniques. Latency SLAs may be supported in at least some embodiments using operating system-level scheduling algorithms of the kind introduced herein, in which the arrival times of task requests, as well as applicable latency SLAs, are used to determine response initiation time targets (RITTs) for the tasks, and then the RITTs are utilized to determine the order in which runnable threads are selected for execution by operating systems at back-end service nodes. RITTs may be set at millisecond or microsecond level granularity in some cases, depending on the SLAs. Furthermore, in at least some embodiments in which a given task requested by a client may include some critical sub-tasks (such as computations required by business logic of the service, which have to be completed before a response can be sent to the client, indicating that at least a portion of the task has completed) and some non-critical sub-tasks (which can be deferred until after the response is sent to the client) deadlines assigned to a thread assigned to process the task may be changed from an RITT-based deadline to a default deadline after the critical sub-tasks are completed. Thus, a given thread identified to perform one or more sub-tasks of a client's task may first be assigned a deadline derived from the RITT of the task and scheduled for execution using that RITT-based deadline. For example, in some implementations an entry representing the thread may be inserted in a deadline-based processor scheduling queue (if there are other threads with more urgent deadlines waiting for the processor). Later, in such an implementation, after the critical sub-tasks have been completed, the deadline parameter of the same thread may be changed to a default value which is independent of the RITT and the thread may be scheduled using the default value (e.g., the entry for the thread may be re-inserted if needed into the deadline-based processor scheduling queue at a position selected based on the default value).

This type of approach to the treatment of different classes of sub-tasks may help ensure that the non-critical sub-tasks of a given task can eventually be completed without delaying critical sub-tasks of other tasks. Similar latency SLA based scheduling may also be implemented at resources other than the processors (e.g., physical or virtualized centralized processing units or CPUs) of the service logic implementation nodes in some embodiments—e.g., the RITTs of tasks may also be used to schedule disk I/Os (input/output operations), networking operations, and/or computations at special-purpose hardware accelerators which may be used for the tasks. In some cases, a given task request directed to a particular cloud provider network service may also require operations at other prover network services, and the latency SLA based scheduling requirements or targets may be propagated from one service to another, so that all the work done on behalf of a client's request may be performed taking the latency SLA into account, regardless of whether the work is performed at the service to which the request was initially transmitted by a client, or at some other service.

As one skilled in the art will appreciate in light of this disclosure, certain embodiments may be capable of achieving various advantages, including some or all of the following: (a) helping to ensure that latency service level agreements of cloud provider network services can be met, without increasing the amount of computing and other resources that are deployed at the services and/or (b) reducing the number of task requests that have to be retransmitted to services (e.g., due to missed response time targets), and thereby reducing the amount of networking and other resources that are consumed for the service. Note that the techniques introduced herein in effect utilize latency SLAs for very low-level scheduling decisions at the operating system level; initiating the execution of high-level workload units such as machine learning jobs in priority order relative to one another may not be able to provide the fine-grained control required to obtain millisecond or sub-millisecond latencies required from some high-performance cloud-based services. Unless the operating system level thread scheduling techniques of the kind described herein are employed, even in systems in the similar higher-level workload units are selected for execution in priority order or deadline order, in at least some cases the work required for the higher-level workload units may be performed in an order which is incorrect from the latency SLA perspective due to the use of conventional thread scheduling algorithms (such as algorithms that attempt to treat threads within a given priority class fairly with respect to one another), leading to a lower probability of satisfying the latency SLAs.

According to some embodiments, a system may include one or more computing devices. The computing devices may include instructions that upon execution at the computing devices receive a request for a task at a request router node of a network-accessible service of a provider network from a task requester. A response initiation time target (RITT), indicating a time by which a response to the request is to be sent (if possible) to the task requester, may be assigned to the task, based at least in part on a service level agreement (SLA) provided or supported by the service. If the time at which the task request is received at the request router is T1, for example, the RITT may be set to (T1+delta), where the value of delta may depend upon the SLA. In some embodiments, the delta value may also depend on one or more other factors, such as a category of the task (selected for example from among several categories of tasks that the service supports for its clients), an estimate of the complexity of the task, an estimate of the amount of processing and/or I/O needed for the task, the identity of the task requester, the time of day at which the task is received, a request parameter (such as an urgency or priority parameter supplied by the task request submitter), and so on.

A representation of the task and its assigned RITT may be transmitted to a service logic implementation node (LIN) from the request router node in some embodiments. The request router node may be referred to as a front-end node, while the LIN may be referred to as a back-end node. A fleet of back-end nodes may be maintained at the network-accessible service in various embodiments. The particular LIN to which a task request is sent may be chosen or selected from the fleet in some embodiments based at least partly on the RITT of the task and/or based on one or more metrics collected from the LIN. For example, in one embodiment a metric of available or unused processing capacity of the LIN, or an indication of the fraction of RITTs that have been missed at the LIN in a recent time interval (the fraction of tasks whose responses were not sent before their respective RITTs) may be used to select the LIN. In one embodiment, some LINs may be executed at servers with greater processing capacity (e.g., faster CPUs/GPUs (graphics processing units) or more CPUs/GPUs) than others, and LINs may be selected for tasks based at least in part on such processing capacity properties. In other embodiments, only a particular LIN may be able to process a given task (e.g., if that LIN stores the only copy of a data item accessed by the task), so the RITT or other metrics may not be used to select a LIN.

The back-end nodes may comprise a highly secured and protected execution environment, which clients of the service cannot access directly. The designers of the service may use customized operating systems at such secure nodes in various embodiments, as opposed to (for example) general purpose off-the-shelf operating systems which may be employed at compute instances or virtual machines accessible directly by clients of the cloud provider network. While such general purpose operating systems may use processor scheduling algorithms such as the "completely fair scheduler" or CFS algorithm of some Linux-based systems, or schedulers which employ at most a small number (e.g., a number representable using an 8-bit integer) of priorities to distinguish the relative importance of different processes or threads, a customized processor scheduler may be employed at the LINs in some embodiments, which is able to use a representation of a time value (the RITT, or a value derived from the RITT) as a deadline parameter for scheduling runnable threads. The RITT may be represented, for example, as a 32-bit or 64-bit integer or a floating point number, enabling an essentially unlimited range of values to be used to order or sequence the execution of runnable threads at the LINs.

In some embodiments, a deadline parameter may be assigned to each thread at a LIN. The deadline parameter for a thread Thr1 assigned to perform a given task may initially be set to a first value V1 based at least partly on the task's RITT. In at least some embodiments, a given task may include some critical tasks (such as computations of the business logic of the service, which have to be completed before a response indicating that at least a portion of the task has succeeded or completed can be sent to the client), and some non-critical tasks (such as logging operations, metrics reporting operations, reformatting operations for data generated during the critical sub-tasks for insertion into a repository, caching operations for data or results which were generated in the critical sub-tasks in a cache for potential re-use, etc.) which can be deferred until after the response is sent to the client. An operating system thread scheduling algorithm that takes the deadline parameter values into account when selecting runnable threads for execution on the processor(s) of the LIN may be employed in various embodiments. In one implementation, for example, the thread Thr1 may be inserted into a processor scheduling queue PSQ whose runnable threads are scheduled for execution at a processor of the LIN in order of increasing deadline parameter values. Note that data structures other than queues may be used in some embodiments, and that several different PSQs or equivalent data structures may be used in other embodiments. In at least one embodiment, unlike in some conventional operating system schedulers, the amount of processing time (e.g., CPU time) that has been consumed by a given thread already, or the processing time requirements of the given thread (i.e., the processing time needed to complete the task being performed by the thread), may not be taken into account when the runnable tasks in the LIN's PSQ are scheduled for execution by the scheduling algorithm.

After the thread is scheduled for execution based on its initial deadline value, it may execute some or all of the critical sub-tasks in various embodiments. In some cases, the thread may relinquish a processor one or more times (e.g., to wait for completion of an I/O operation or a system call), and be rescheduled on the processer in accordance with its RITT-based deadline value, before the critical sub-tasks are completed. In response to determining, after the thread has been scheduled for execution in accordance with the value V1 of the deadline parameter, that the critical sub-tasks have been completed no later than the first response initiation time target, a response indicating completion of at least a portion of the task may be sent to the task requester in some embodiments. Further, if there are non-critical sub-tasks that remain, in one embodiment the deadline parameter of Thr1 may be set to a second value V2 (e.g., representing a lower urgency than V1) and Thr1 may then be scheduled by the operating system's scheduling algorithm in accordance with V2. For example, an entry representing the thread may be removed from its V1-based position in a PSQ, and re-inserted at a position dependent on V2. The non-critical sub-tasks may then be completed when Thr1 is eventually scheduled using V2 as the deadline. Note that in some cases, a given task may not include any non-critical sub-tasks.

In some embodiments, the RITT-based deadline values may be used for scheduling threads at not just the primary processors (e.g., CPUs) of the LIN for critical sub-tasks, but also for scheduling operations at other types of resources during the time periods in which the critical sub-tasks have not yet been completed. For example, in some embodiments, if an I/O operation (such as a disk read or a disk write, or a network transmission operation) is to be performed as part of a critical sub-task, the deadline value that is being used for processor scheduling for the parent task of the critical sub-task may also be provided to an I/O scheduler. The I/O scheduler may then use the deadline value when scheduling I/O tasks.

Latency SLA based scheduling of the kind introduced above may be implemented at several kinds of network-accessible services in different embodiments. For example, database services, object storage services, distributed file system services, streaming data ingestion services, and/or machine learning services where input data has to be analyzed quickly, may all benefit from using RITT-based parameters for scheduling.

In some embodiments, a default deadline value (effectively equivalent to a deadline in the distant future, or an infinite deadline) may be assigned to threads that have completed the critical sub-tasks of the task to which the threads were assigned, and/or to threads that are assigned to tasks that are not associated with latency SLAs. If and when a thread for whose tasks an RITT has not been identified becomes runnable or has to be inserted into a scheduling queue, such a default deadline value may be used to order the thread's execution relative to other threads, or to determine the position in which the thread is inserted in such an embodiment. In at least some embodiments, threads that share a given deadline parameter value (e.g., threads assigned the default deadline) may be scheduled for execution in first-in-first-out order.

In some cases, a given task may comprise a plurality of critical sub-tasks that can be performed at least partly in parallel. In one embodiment, respective threads may be created for each such sub-task at the LIN, and all the threads may be assigned the same RITT-based deadline value using the RITT of the parent task. In some embodiments, a given task request, received initially at one network-accessible service Svc-A of a provider network, may require operations or sub-tasks to be performed at one or more other services such as Svc-B and Svc-C. For such multi-service tasks, the RITT may be transmitted from a LIN of Svc-A to a LIN of Svc-B or a LIN of Svc-C. and used for scheduling operations or sub-tasks at Svc-A and Svc-B. As such, the operating system-level schedulers at several different services may perform thread scheduling in a fully-aligned manner.

It may sometimes be the case that the critical sub-tasks of a given task cannot be completed before the RITT assigned to the task. In some embodiments, network-accessible services that provide latency SLAs may enable clients to specify policies indicating the kinds of actions that should be taken under such missed-RITT circumstances. For example, a client may indicate, based on the semantics of the client's applications, that the service should continue to try to complete a task whose RITT has been missed (which may be referred to as a best-effort policy), that the service should notify the client if/when an RITT is about to be missed or has just been missed and await a response to determine what action to take, or that the service should simply discard requests whose RITT has been missed. In at least some embodiments, network-accessible services providing latency SLAs may provide various latency-related metrics to their clients, including for example the fraction of request whose responses were provided on or before their respective RITTs.

In at least some embodiments, as indicated above, the latency SLA-based scheduling techniques introduced above may be implemented at one or more services of a cloud provider network or cloud computing environment. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet or a cellular communication network) and the hardware and software in cloud provider data centers that provide those services.

A cloud provider network can be formed as a number of regions, where a region is a separate geographical area in which the cloud provider clusters data centers. Such a region may also be referred to as a provider network-defined region, as its boundaries may not necessarily coincide with those of countries, states, etc. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g., via a virtual private network (VPN) or direct connection) to the availability zones. Each region can operate two or more TCs for redundancy. Regions are connected to a global network connecting each region to at least one other region. The cloud provider network may deliver content from points of presence outside of, but networked with, these regions by way of edge locations and regional edge cache servers (points of presence, or PoPs). This compartmentalization and geographic distribution of computing hardware enables the cloud provider network to provide low-latency resource access to customers on a global scale with a high degree of fault tolerance and stability.

In some embodiments, at least a subset of the resources being used to process service requests at a given service may be located within a provider network region, at an edge location of the provider network, or at a provider network extension location. An edge location (or "edge zone"), as referred to herein, can be structured in several ways. In some implementations, an edge location can be an extension of the cloud provider network substrate including a limited quantity of capacity provided outside of an availability zone (e.g., in a small data center or other facility of the cloud provider that is located close to a customer workload and that may be distant from any availability zones). Some edge locations may be referred to as local zones (due to being more local or proximate to a group of users than traditional availability zones). A local zone may be connected in various ways to a publicly accessible network such as the Internet, for example directly, via another network, or via a private connection to a region. Although typically a local zone would have more limited capacity than a region, in some cases a local zone may have substantial capacity, for example thousands of racks or more. Some local zones may use similar infrastructure as typical cloud provider data centers. An extension location may comprise a portion of a client-owned premise at which one or more data plane servers at which compute instances or other logical resources of the provider network can be launched are located. Special highly secure channels using various kinds of tunneling technologies may be established for transmitting commands (e.g., commands to launch compute instances and/or containers) from the control plane servers of the provider network (which remain at provider network data centers) to the extension location data plane servers in various embodiments.

The cloud provider network may implement various computing resources or services, which may include, a virtualized computing service (VCS), data processing service(s) (e.g., map reduce, data flow, and/or other large scale data processing techniques), data storage services (e.g., database services, object storage services, file system services, block-based storage services, or data warehouse storage services), packet processing services, and/or any other type of network based services (which may include various other types of storage, processing, analysis, communication, event handling, visualization, and security services). The resources required to support the operations of such services (e.g., compute and storage resources) may be provisioned in an account associated with the cloud provider, in contrast to resources requested by users of the cloud provider network, which may be provisioned in user accounts.

Network-accessible computing services can include an elastic compute cloud service or VCS (referred to in various implementations as an elastic compute service, a virtual machines service, a computing cloud service, a compute engine, or a cloud compute service). Such a service may offer compute instances (also referred to as guest virtual machines, or simply "instances") with varying computational and/or memory resources, which are managed by a compute virtualization service (referred to in various implementations as an elastic compute service, a virtual machines service, a computing cloud service, a compute engine, or a cloud compute service). In one embodiment, each of the virtual compute instances may correspond to one of several instance types or families. An instance type may be characterized by its hardware type, computational resources (e.g., number, type, and configuration of virtualized central processing units (VCPUs or VCPU cores), memory resources (e.g., capacity, type, and configuration of local memory), storage resources (e.g., capacity, type, and configuration of locally accessible storage), network resources (e.g., characteristics of its network interface and/or network capabilities), hardware accelerator resources and/or other suitable descriptive characteristics (such as a "burstable" instance type that has a baseline performance guarantee and the ability to periodically burst above that baseline, or a non-burstable or dedicated instance type that is allotted and guaranteed a fixed quantity of resources). Each instance type can have a specific ratio of processing, local storage, memory, and networking resources, and different instance families may have differing types of these resources as well. Multiple sizes of these resource configurations can be available within a given instance type. Using instance type selection functionality, an instance type may be selected for a customer or for use as front-end nodes (e.g., request router nodes) or back-end nodes (such as logic implementation nodes) of other services, e.g., based (at least in part) on input from the customer or administrators of the other services. For example, a customer may choose an instance type from a predefined set of instance types. As another example, a customer may specify the desired resources of an instance type and/or requirements of a workload that the instance will run, and the instance type selection functionality may select an instance type based on such a specification. A suitable host for the requested instance type can be selected based at least partly on factors such as collected network performance metrics, resource utilization levels at different available hosts, and so on. In some embodiments, instances of several different instance types may be launched at extension premises in response to programmatic requests from a client. Other types of network-accessible services, such as packet processing services, database services, wide area networking (WAN) services and the like may also be implemented at the cloud provider network in some embodiments.

The traffic and operations of the cloud provider network (or individual services of the cloud provider network) may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, or system state information). The data plane includes customer resources that are implemented on the cloud provider network (e.g., computing instances, containers, block storage volumes, databases, or file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

FIG. 1 illustrates an example system environment in which threads assigned to perform tasks on behalf of clients of cloud provider network services may be scheduled for execution at processors of service business logic implementation nodes based at least partly on latency service level agreements, according to at least some embodiments. As shown, system 100 comprises resources and artifacts of a network-accessible service 120 implemented at a cloud provider network 102, including control plane nodes (CPNs) 121, a service business logic implementation nodes (LINs) fleet 122 comprising a plurality of LINs 124 such as LIN 124A and LIN 124B, and a front-end node fleet 142 comprising request routers (RRs) such as RR 144A and 144B in the depicted embodiment. The network-accessible service 120 may, for example, be a database service, an object storage service, or a file system service.

Requests for tasks to be implemented at the service 120 may be transmitted from client devices 177 (e.g., laptops, desktops, mobile computing devices and the like) to the request routers 144 via programmatic interfaces 128. The programmatic interfaces 128 may include, for example, web-based consoles, command-line tools, application programming interfaces (APIs), graphical user interfaces or the like. The requests may be transmitted from the request routers to selected LINs 124, where the business logic of the service may be executed in the depicted embodiment. Responses to the task requests may be sent from the LINs to the request submitters via the request routers in some embodiments, and directly from the LINs to the request submitters in other embodiments. A given request router or LIN may be implemented using some combination of hardware and software at one or more computing devices. In some embodiments, at least some request routers may be co-located at the same hosts or servers as one or more LINs. The CPNs 121 may monitor and manage the membership pf the LINs fleet and the front-end node fleet in the depicted embodiment, for example by dynamically adding new fleet members or removing fleet members as needed based on changing workload needs.

The service 120 may provide or support one or more types of service level agreements (SLAs), including at least some latency service level agreements in the depicted embodiment. A latency SLA may in effect inform a client of the service regarding how long it should take the service to provide (after a request for a task is received) a response indicating successful completion of a requested task. The specific latencies which the service agrees to support for responses to client task requests may vary based on several parameters in different embodiments, such as the complexity or category of the task, the billing rate the client is willing to pay, and so on. In some embodiments, at least some categories of tasks may include critical sub-tasks (which have to be completed before a response indicating successful completion is provided to the requester of the task) and one or more non-critical or deferrable sub-tasks (which can be completed before or after the response is sent to the requester, but do not have to be completed before the response is sent). In addition to latency SLAs, some network-accessible services may also provide throughput SLAs (sometimes referred to as "provisioned throughputs"), indicating for example the rates at which task requests can be processed at the service or the number of task requests that can be submitted concurrently or near-concurrently to the service. Different SLAs may be set up with respective clients of a network-accessible service in some embodiments—e.g., a latency SLA set up for client C1 may indicate that 99% of tasks of category Cat1 will be completed (and responded to) within T1 milliseconds, while a latency SLA set up for another client C2 may indicate that 95% of tasks of category C2 will be completed within T2 milliseconds. Representations of the latency SLAs in effect for different categories of tasks for respective clients may be stored in latency SLA metadata repository 171 in the depicted embodiment, and representations of throughput SLAs for different categories of tasks for respective clients may be stored in throughput SLA metadata repository 172. In some embodiments, a given service may provide or support the same latency SLA (or SLAs) and/or the same throughput SLA (or SLAs) for all clients for a given task category. In other embodiments, only a single category of task may be executed for all clients of the service, so category-specific SLAs may not be required.

In some embodiments in which throughput SLAs are provided, admission controllers (such as admission controllers 145A or 145B) running at the request routers may be responsible for rejecting requests that would result in higher request rates than the throughput SLAs allow. For example, a token bucket based admission control algorithm may be used in some embodiments, in which a given task request from a client is only accepted if a token bucket set up for that client contains a token, and each accepted request results in the removal of a token from the bucket. The rate at which a token bucket is refilled may be dependent on the request rate permitted by the applicable throughput SLA, e.g., in a scenario in which 1000 request/second are permitted, the token population within a bucket may be re-adjusted to 1000 at 1-second intervals.

In the depicted embodiment, for those task requests which are accepted for further processing by an admission controller 145, a response initiation target time (RITT) assigner 147 (e.g., RITT assigner 147A or 147B) may identify, based at least partly on an applicable latency SLA for a task request, the RITT for that task. In effect, if a task is received at a request router from a client device at a time T1, an RITT equal to (T1+delta) may be selected and assigned by the RITT assigner for the task, where the value of delta depends on the applicable latency SLA for the task. In some cases, the value of delta may also be selected based on other factors, such as additional request parameters supplied as part of the task request by the client, the particular time of day or location from which the request is received, and so on.

After the RITT has been assigned to a task, a LIN selector 146 (such as LIN selector 146A or 146B) may choose a particular LIN 124 at which at least a portion of the requested task should be performed. In at least some embodiments, the specific LIN to be used for a task may be chosen based at least in part on the task's RITT and/or at least one metric obtained from the LIN. The metrics may for example indicate the current capacities of the LINs for taking on additional urgent tasks, using resource utilization values, queue lengths of operating system thread scheduling queues, and so on. In some cases, some LINs may be equipped with more computational resources than others, and such differences may also be taken into account to select a destination LIN for a task request. For example, some LINs may comprise high-end processors which can handle very large numbers of concurrent task requests in parallel, while others may have lower raw computational capacities.

A representation of the task request, along with the RITT assigned to the task, may be sent to the selected LIN from an RR in the depicted embodiment. The LIN may comprise a set of service logic programs 125 (e.g., service logic programs 125A or 125B) as well as an operating system 126 (e.g., OS 126A or 126B) in the depicted embodiment. The service logic programs, also referred to as application programs of the service 120, may for example include thread pool managers 129 (e.g., thread pool managers 129A or 129B) and sub-task managers 130 (e.g., sub-task managers 130A or 130B) in the depicted embodiment. A thread pool manager may for example set up a collection of threads by invoking operating system primitives, and assign respective threads to process respective task requests in the depicted embodiment. In scenarios in which a given task includes some number of sub-tasks, including one or more critical sub-tasks and one or more non-critical sub-tasks, a sub-task manager may be responsible for orchestrating the execution of the sub-tasks, changing deadline priorities of the threads assigned to a task based on whether the critical sub-tasks have been completed or not, and so on.

The operating systems 126 may each comprise at least one RITT-based thread scheduler (RTS) 127 in the depicted embodiment. When a new task request TR1 is received at the LIN from an RR, the RITT assigned to the task may be used to assign a deadline value V1 to a thread Thr1 assigned to TR. In some embodiments, the RITT itself (which may be represented as a 32-bit or 64-bit integer) may be used as V1, while in other embodiments, V1 may be derived from but differ from the RITT. The RTS may cause various threads including thread Thr1, when the threads become runnable, to be scheduled for execution at a processor (e.g., a physical or virtualized CPU or GPU) in increasing order of their deadline values in various embodiments. In some implementations, for example, data structures or entries representing the threads may be inserted into a processor scheduling queue (PSQ) in deadline order, with runnable threads being provided processor time in deadline order. In at least some embodiments, factors such as the processing requirements of the threads or the accumulated processing time consumed thus far by the threads may not be used by the RTS when scheduling runnable threads.

In some embodiments in which a given task to which Thr1 has been assigned comprises at least one critical sub-task and at least one non-critical sub-task, the following approach may be employed. After an RITT-based deadline value V1 has been used to schedule the execution of Thr1 and the critical sub-tasks have been completed (which may take several iterations of queueing and scheduling/dispatching the thread, depending on whether the critical sub-tasks require system call invocations, disk I/Os, etc.), a response indicating successful completion of at least a portion of the task may be sent to the client. The deadline value of Thr1 may be set to a different value V2 (e.g., a default deadline value which indicates lower urgency than RITT-based deadline values) after the critical sub-tasks are completed in various embodiments. Thr1 may subsequently be scheduled, e.g., for executing the non-critical task(s) of the task, based on V2 rather than V1, thereby ensuring that critical sub-tasks of other tasks are not delayed by non-critical tasks of the task to which Thr1 is assigned. Eventually, the non-critical sub-tasks of the task may also be completed after Thr1 gets processor time using its modified deadline V2 in such embodiments.

In at least one embodiment, the RITT value assigned to a given task request may be used not just for scheduling CPU or GPU resources, but also for scheduling other types of operations at the LINs and/or at remote resources. For example, a disk I/O scheduler component of the operating system may use the RITT to schedule disk I/Os, network transfers may be initiated or processed based on RITTs, operations or computations at special hardware accelerators which may be employed for some types of tasks may be scheduled using RTTs, and so on. In some embodiments, a given task request directed to one service 120 may require operations to be performed at one or more other services of the provider network 102, and the RITT information for that task may be propagated to other services and used to schedule resource there based at least partly on the latency SLA of the task. In some embodiments, multiple threads may be launched or spawned to implement respective critical sub-tasks of a given task at least partly in parallel, and the RITT of the task may be used to schedule each such spawned thread.

A network-accessible service 120 may sometimes be unable to complete even the critical sub-tasks of a given task before the RITT is reached. In some embodiments, clients of the service may be able to specify policies that indicate the kinds of actions which are to be taken by the service under such circumstances—e.g., whether the service should simply drop tasks whose RITTs have passed, attempt to complete the tasks even though their RITTs have passed, and so on. Metrics pertaining to various aspects of the tasks submitted by a client, such as the fraction of tasks for which completion responses were transmitted before their RITTs, the rates at which task requests were processed over various time intervals, and so on, may be provided to clients via programmatic interfaces 128 in at least some embodiments.

Figure 2:
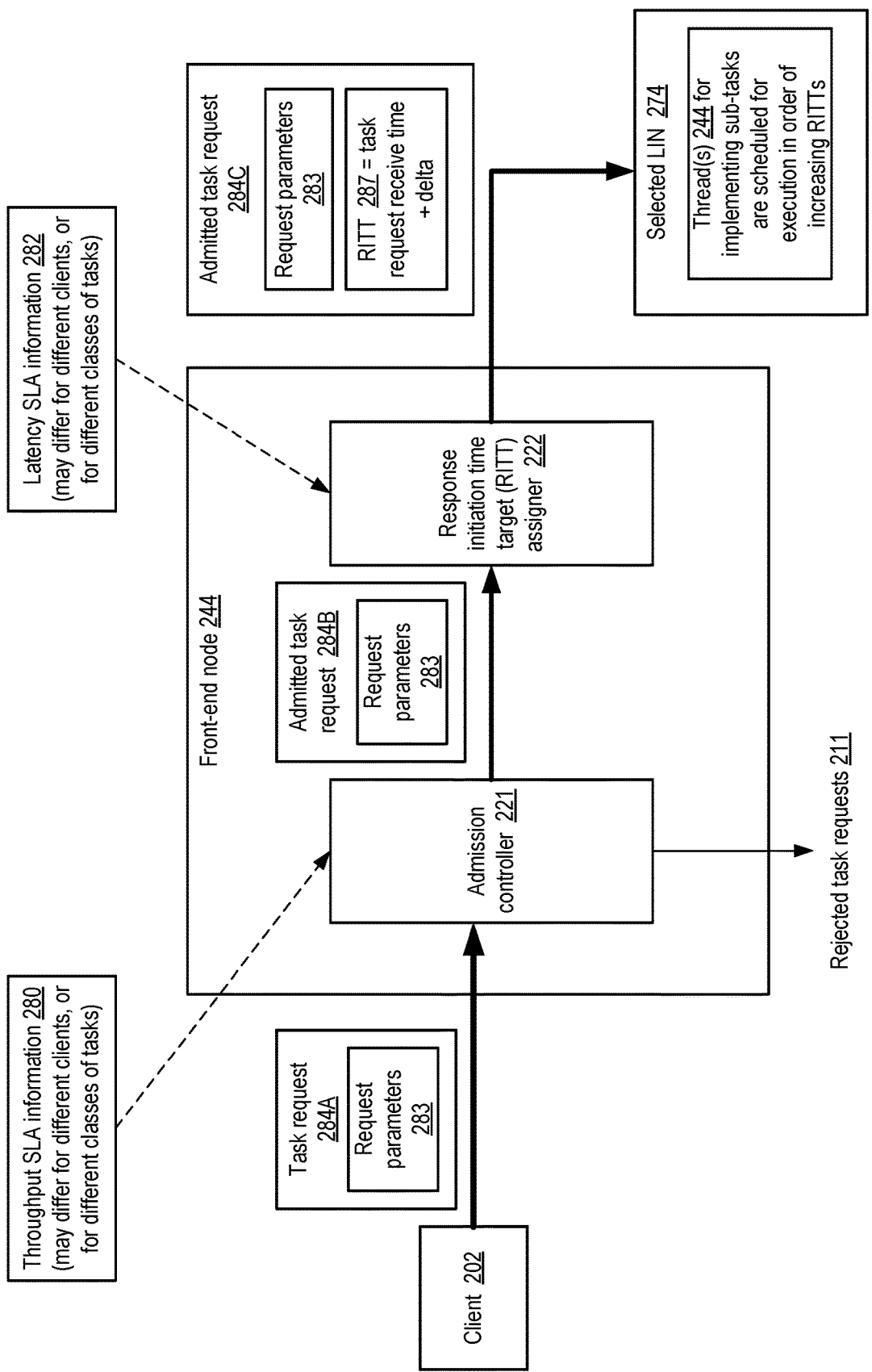
FIG. 2 illustrates an example scenario in which a front-end node of a cloud provider network service may assign response initiation time targets to tasks, and transmit such targets to service logic implementation nodes where the targets may be used to schedule the execution of threads used for the tasks, according to at least some embodiments.

FIG. 2 illustrates an example scenario in which a front-end node of a cloud provider network service may assign response initiation time targets to tasks, and transmit such targets to service logic implementation nodes where the targets may be used to schedule the execution of threads used for the tasks, according to at least some embodiments. A client 202 of a network-accessible service may submit a task request 284A, which includes a set of request parameters 283, to a front-end node 244 of a network-accessible service which provides throughput SLAs and latency SLAs in the depicted embodiment. The request parameters may indicate the type of task to be performed, input parameters for the task, an indication of the identity of the client, an indication of a priority assigned by the client to the task, sub-tasks to be performed as part of the task, and so on. An admission controller 221 of the front-end node may make a determination, based at least in part on throughput SLA information 280 and/or the request parameters 283, whether the task request is to be accepted for processing, or rejected. Any of a variety of admission control algorithms may be employed in different embodiments, such as token bucket based algorithms of the kind mentioned earlier. Rejected task requests 211 may be discarded by the admission controller, while accepted requests, such as accepted task request 284B may be sent to a response initiation time target (RITT) assigner 222 of the front-end node.

Based at least in part on analysis of applicable latency SLA information 282, the RITT assigner may identify an RITT 287 for the task, and include that RITT in the version of the admitted task request 284C which is sent to a selected back-end logic implementation node (LIN) 274 in the depicted embodiment. The RITT 287 may be computed by adding a delta value to the time at which the task request was received at the front-end node in some embodiments. The delta value may be determined by the RITT based on the latency SLA and/or based on one or more of the request parameters 283 in the depicted embodiment. The throughput SLA and/or the latency SLA may differ for different clients in some embodiments, e.g., based on options selected by the client. In addition, in at least some embodiments, the throughput and/or latency SLAs may differ for respective classes or categories of task requests—for example, reads directed to a database service may have different SLAs than writes, the SLAs may vary based on the amount of data transferred in a read or write request, and so on.

The RITTs assigned to the tasks may be used to the selected LINs 274 to determine the order in which threads assigned to perform the tasks are scheduled at one or more resources in various embodiments. For example, a value of a deadline parameter may be determined for each thread based on the RITT of the task to which the thread is assigned, and runnable threads may be dispatched or executed in order of increasing deadline values (which may correspond to increasing RITT values).

Figure 3:
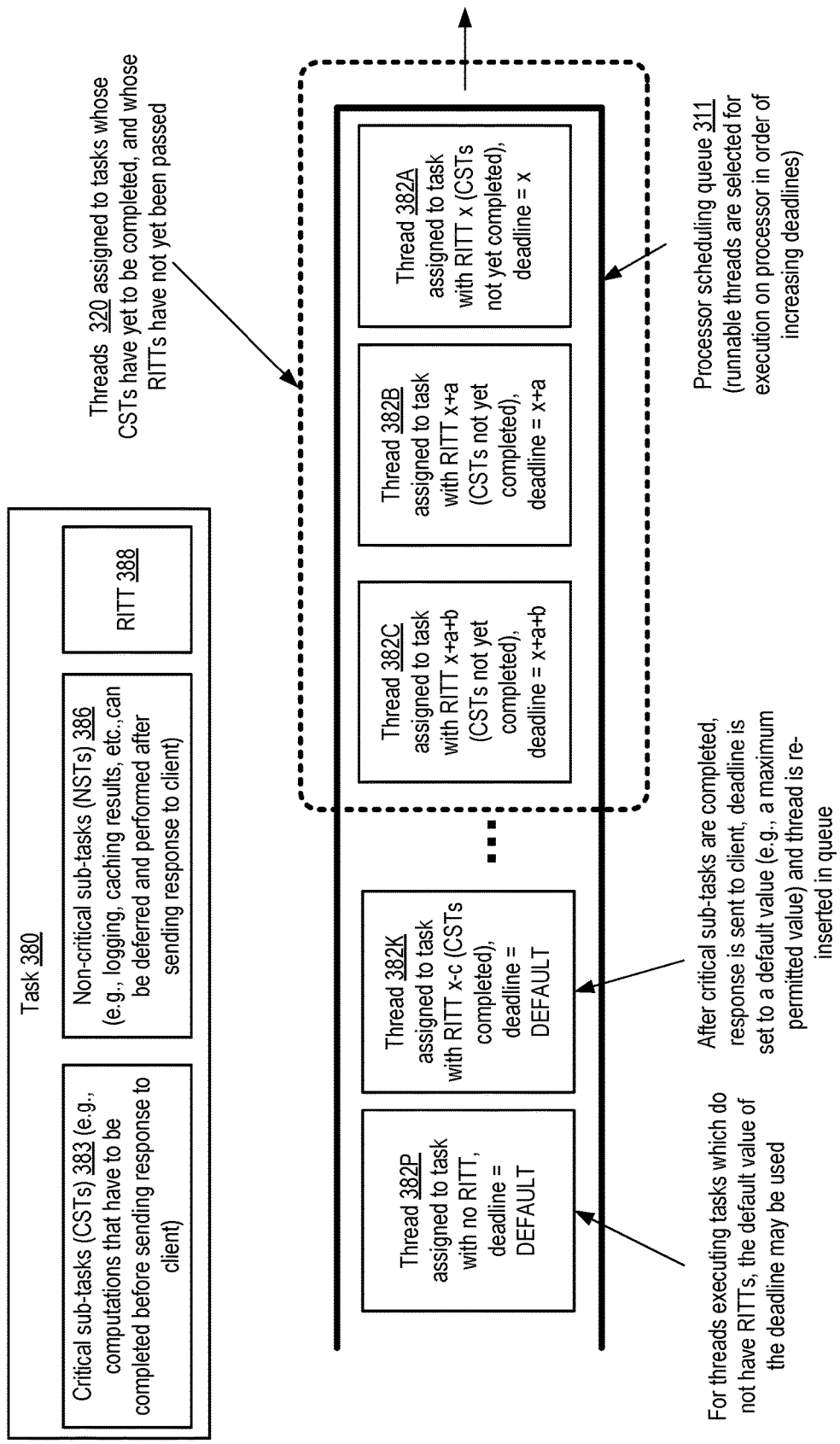
FIG. 3 illustrates examples of the use of deadline parameters for scheduling threads at service logic implementation nodes, according to at least some embodiments.

FIG. 3 illustrates examples of the use of deadline parameters for scheduling threads at service logic implementation nodes, according to at least some embodiments. In the depicted embodiment, a given task 380 which is to be scheduled at a logic implementation node of a network-accessible service is assumed to comprise one or more critical sub-tasks (CSTs) 383 and one or more non-critical sub-tasks (NSTs) 386. The CSTs may for example comprise computations of the business logic of the service, and may have to be completed before a response to the request for the task is sent to the client at whose request the task is being performed. The NSTs may include operations such as generating and storing log messages pertaining to the task, caching results obtained in the critical sub-tasks for potential re-use, generating metrics, and the like. In contrast to the CSTs, the NSTs may be deferred until after the response is sent to the client, although an NST need not necessarily be performed after the response is sent. A task 380 may also have an associated RITT 388, generated as discussed earlier based at least in part on an applicable latency SLA.

A processor scheduling queue 311 of a logic implementation node (LIN) of the service selected for implementing a task 380 may comprise respective entries for various threads in the depicted embodiment. A respective deadline value may be assigned to each thread, and used to determine the position within the processor scheduling queue at which the entry for the thread is inserted (assuming that there are several threads that are waiting to be scheduled/dispatched). Threads may be arranged in order of increasing deadline values, starting with the lowest deadline value (among the current set of threads) at the head of the processor scheduling queue in various embodiments. Among the runnable threads at any given point of time at which a processor becomes available, the thread with the lowest deadline value may be selected for execution. Note that the operating system thread scheduler or dispatching subsystem of a given LIN may not necessarily implement a processor scheduling queue with the kinds of information shown in FIG. 3 in some embodiments; the queue shown in FIG. 3 is used as an example to illustrate the manner in which latency-based values may be used to order the execution of threads.

In various embodiments, a given thread assigned to a task may first attempt to finish execution of the task's CSTs, and only start executing the NSTs after the CSTs are completed. For those tasks which have RITTs assigned, the deadline parameter for the corresponding threads may be set based on the RITTs until the CSTs have been completed, and then set to a default value in the depicted embodiment. In scenarios in which the task comprises multiple CSTs which have to be executed in sequence, a sub-task manager similar to the sub-task managers 130 shown in FIG. 1 may orchestrate the sequencing of the CSTs. Note that it may not necessarily be the case that a given thread that is scheduled for execution is able to complete all the CSTs (or even a single CST) of its task before it has to give up the processor—for example, a system call may be invoked on behalf of the thread during a CST, or an I/O operation may be required, and the thread may have to give up the processor until the system call or I/O operation completes.

The threads 320 whose entries are positioned nearest the head of the queue may be those threads whose CSTs have not yet been completed, and whose RITTs have not yet been passed or elapsed. For example, thread 382A at the head of the queue may be assigned to a task with RITT x, and a deadline parameter value for the thread 382A may also be set to x in the depicted embodiment while the CSTs of the task are not yet completed. For thread 382B assigned to a task with RITT (x+a), the deadline parameter value be set to (x+a), and for thread 382C assigned to a task with RITT (x+a+b), the deadline parameter value may be set to (x+a+b).

When the CSTs of a task are completed, but one or more NSTs remain unfinished, the deadline parameter value of the thread assigned to the task may be changed to a default value (referred to in FIG. 3 as DEFAULT), and the thread may be re-inserted into the queue 311 if needed. The default value may exceed all the RITT-based deadline values—for example, a very large numerical value representing infinity may be used, or a time value set a year in the future may be used, and so on. In the queue 311, thread 382K is assigned to a task which has an RITT (x−c), which is lower than the RITTs of the threads 320, but the deadline value for thread 382K is set to DEFAULT because the CSTs of the task have been completed. For any threads that may be executing tasks which do not have RITTs assigned (such as local data management tasks of the LIN, which are not triggered by client requests), such as task 382P, the default value may also as the deadline parameter in the depicted embodiment. In one embodiment, a thread manager or an operating system component of the LIN may set the default value as the deadline for all threads initially, and RITT-based values may later be assigned to those threads that are identified for implementing tasks to which RITTs have been assigned. In one embodiment, if a given task includes both critical and non-critical sub-tasks, a critical sub-task may be performed by one thread using an RITT-based deadline parameter, and a non-critical sub-task may be performed by another thread using the default value of the deadline parameter.

Figure 4:
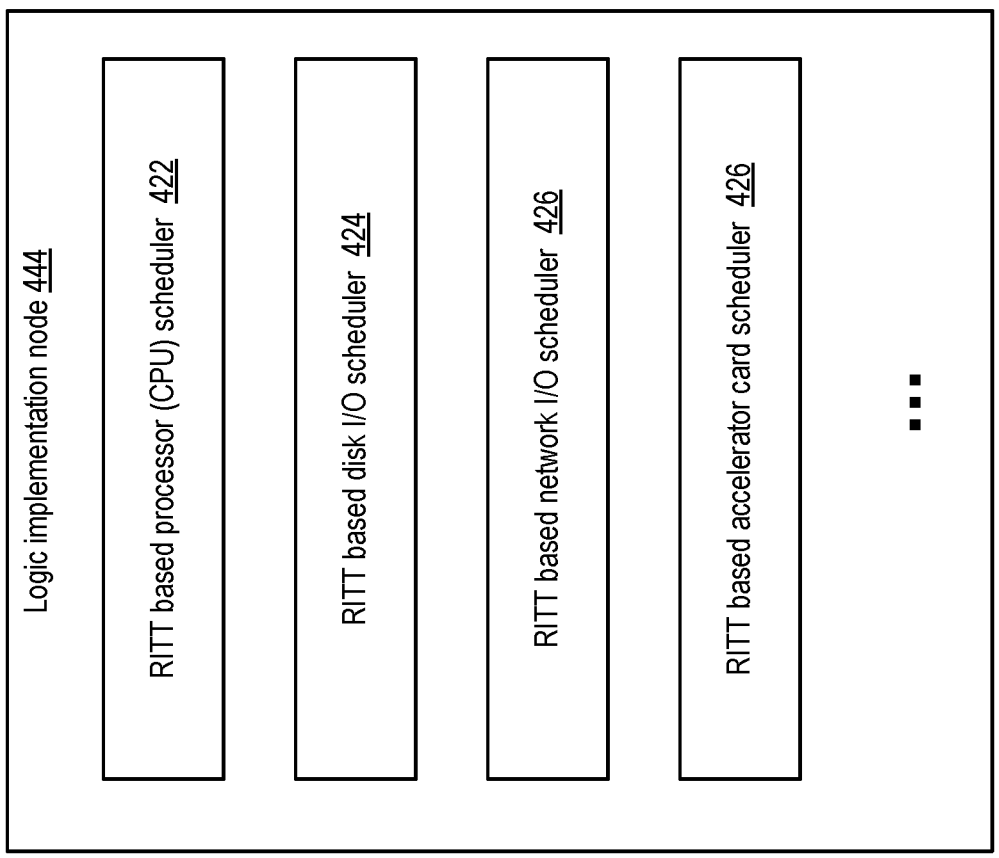
FIG. 4 illustrates examples of schedulers at service logic implementation nodes, according to at least some embodiments.

As mentioned earlier, in some embodiments access to resources other than the primary processors or CPUs of logic implementation nodes may be scheduled taking latency SLA consideration into account. FIG. 4 illustrates examples of schedulers at service logic implementation nodes, according to at least some embodiments. As shown logic implementation node 444 may comprise an RITT based processor scheduler 422, an RITT based disk scheduler 424, an RITT based network I/O scheduler 426, and an RITT based accelerator card scheduler. Each of the scheduler, when deciding which thread or operation is to be provided a resource next, may in at least some cases (e.g., before all the critical sub-tasks of the corresponding task have been completed) use the RITT of the task for which that thread or operation is to be performed as one of the factors used to make the decision.

As a consequence of using RITTs for scheduling decisions at various resources which may have to be accessed or used for a task requested by a client of a network-accessible service, scenarios referred to as priority inversions may be prevented in the depicted embodiment. A priority inversion is said to occur if a task with a higher priority (e.g., a task with a lower RITT) is prevented from making progress by another task with a lower priority (e.g., a task with a higher RITT). If the RITTs were used only for processor scheduling decisions but not for disk I/O operation scheduling, for example if disk I/O requests were processed in FIFO (first-in-first-out) order, a task T1 may have to wait for several other disk I/O operations (e.g., of tasks which have higher RITTs) to complete before T1's own disk I/O can be performed, which would make it less likely that T1 meets its RITT objective.

Figure 5:
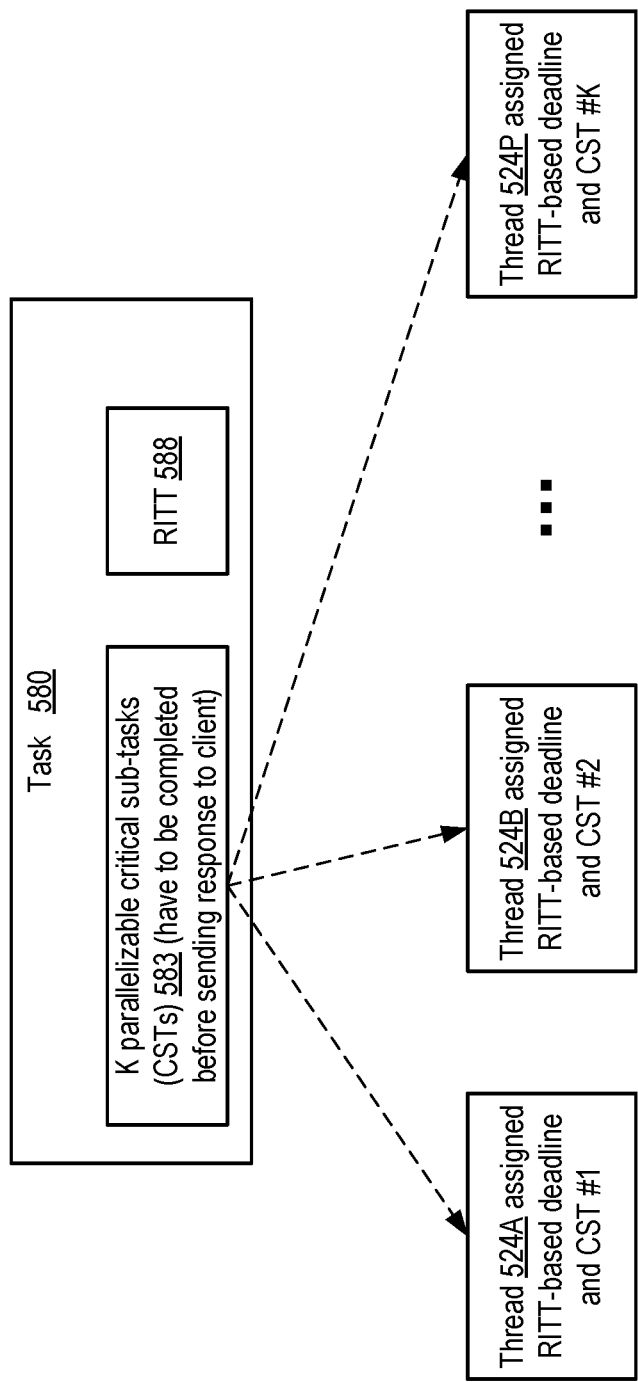
FIG. 5 illustrates an example of using response initiation time targets to schedule multiple sub-tasks that can be executed at least partly in parallel to respond to a client's task request at a service logic implementation node, according to at least some embodiments.

FIG. 5 illustrates an example of using response initiation time targets to schedule multiple sub-tasks that can be executed at least partly in parallel to respond to a client's task request at a service logic implementation node, according to at least some embodiments. In the scenario depicted in FIG. 5, a task 580 which comprises K parallelizable critical sub-tasks (CSTs) 583 may be requested by a client of a network-accessible service. An RITT 588 may be assigned to the task 580 based at least partly on latency SLA considerations.

A sub-task manager of the logic implementation node at which the task 580 is to be performed may cause respective threads to be assigned each of the K sub-tasks in the depicted embodiment. Thread 524A may be assigned critical CST #1, thread 524B may be assigned CST #2, thread 524P may be assigned CST #K, and so on. Each of the threads may be assigned the same RITT 588 based deadline parameter value in some embodiments, enabling all the sub-tasks to compete for resources on an equal footing in the example scenario shown in FIG. 5. If the task 580 comprises one or more non-critical tasks, in one embodiment a thread pool manager of the LIN may assign one of the K threads to perform at least one of the non-critical sub-tasks (with a deadline parameter value that differs from the value corresponding to RITT 588) after the thread's critical sub-task is completed in the depicted embodiment.

Figure 6:
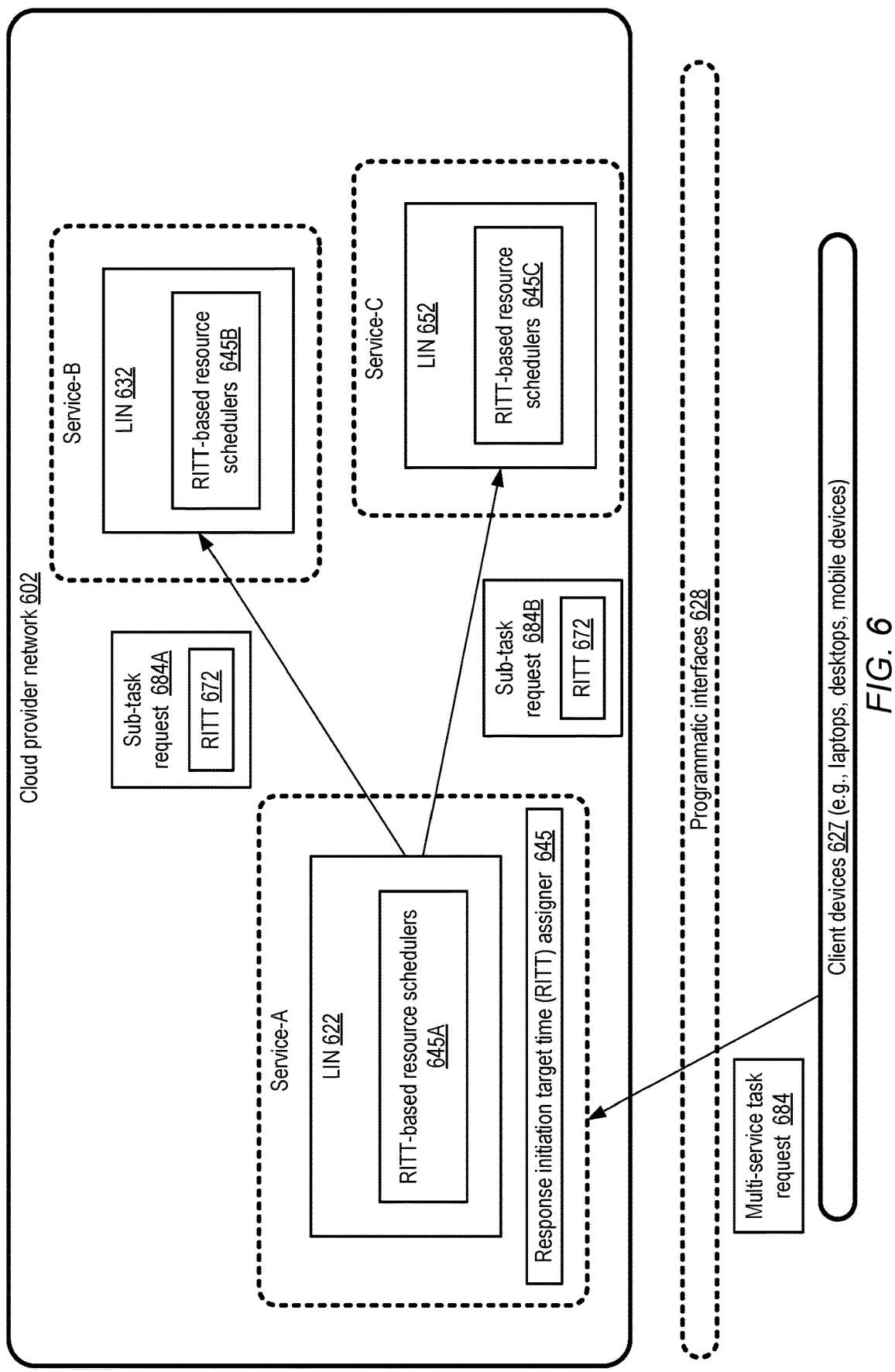
FIG. 6 illustrates an example of the propagation of response initiation time targets between services of a cloud provider network, according to at least some embodiments.

FIG. 6 illustrates an example of the propagation of response initiation time targets between services of a cloud provider network, according to at least some embodiments. In the scenario depicted in FIG. 6, clients of a cloud provider network 602 may submit multi-service task requests 684 via programmatic interfaces 628 to a selected service Service-A from client devices 627, such as laptops, desktops etc. In some cases, the client submitting the task request may not necessarily be aware that operations or sub-tasks at multiple services of the provider network may be needed for their overall task; from the client's perspective, the task may be considered a Service-A task, and Service-A may be responsible for orchestrating all the operations needed to complete the task.

A task request 684 may need respective sub-tasks performed at Service-B and Service-C. Service-A may comprise an RITT assigner 645 in the depicted embodiment, which may determine the RITT for the task based on the applicable latency SLA and/or other factors. One or more RITT-based resource schedulers 645A at a service business logic implementation node LIN 622 may perform one or more sub-tasks of the requested task, and also issue sub-task requests to Service-B and Service-C when needed in the depicted scenario. The sub-task requests 684A (received at LIN 632 of Service-B) and 684B (received at LIN 652 of Service-C) may include the RITT 672. RITT-based resource schedulers 645B and 645C may take the RITT 672 into account when scheduling operations or threads at LINs 632 and 652 respectively in the depicted embodiment. In some embodiments, each of the services, including Service-B and Service-C may include their respective front-end nodes with RITT assigners, and the RITT 672 may be set as the RITT for the sub-tasks by these RITT assigners. In effect, the RITT 672 may be propagated from the first network-accessible service at which the client's request is initially received to any other service which may be needed to fulfill the requested task in the depicted embodiment, and resource schedulers at each of the services may utilize the RITT 672 to make scheduling/dispatching decisions.

Figure 7:
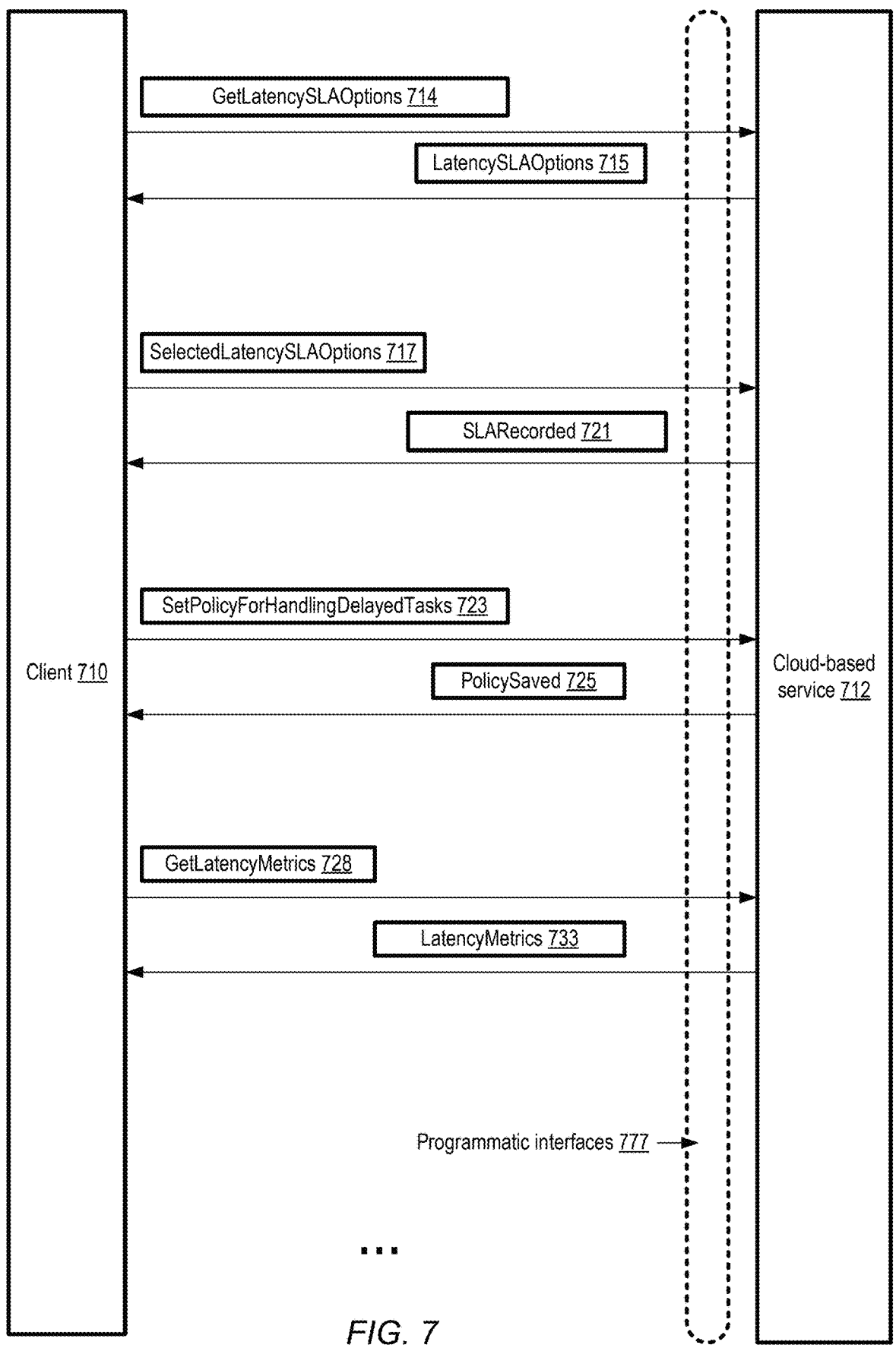
FIG. 7 illustrates example programmatic interactions between clients and a cloud-based service which provides latency service level agreements, according to at least some embodiments.

FIG. 7 illustrates example programmatic interactions between clients and a cloud-based service which provides latency service level agreements, according to at least some embodiments. The cloud-based service 712, implemented at a provider network similar to provider network 102 of FIG. 1, may implement a set of programmatic interfaces 777, such as one or more web-based consoles, command-line tools, APIs, graphical user interfaces and the like for current or prospective service clients in the depicted embodiment. Using the interfaces 777, a client 710 may submit a GetLatencySLAOptions request 714 to obtain an indication of the kinds of latencies that the service 712 can support for various types of tasks. A list of one or more options may be provided by the service in a LatencySLAOptions message 715 in the depicted embodiment. In some cases, different billing costs may be associated with respective latency operations, and the client's decision to select a particular latency SLA option may depend on the client's budget. For example, the latency options supported by the service may comprise the following: for 99% of requests of type A, the service can provide a latency of M1 milliseconds for a cost of C1, a latency of M2 milliseconds (where M2>M1) for a cost of C2 (where C2<C1), and so on.

The client 710 may indicate, using a SelectedLatencySLAOptions message 717, the particular latency option or options that the client has selected from among the supported latency options of the service. The selected SLA options may be stored as part of the service's SLA and/or client metadata, and an SLARecorded message 721 may be sent to the client in some embodiments.

For tasks which for some reason have not been completed (and/or for which responses have not been initiated) before their latency-related deadlines or RITTs, a client 710 may submit a SetPolicyForHandlingDelayedTasks request 723 specifying a policy governing the actions that should be taken in the depicted embodiment. The actions indicated in a policy for may include, for example, making a best effort to complete the delayed tasks, rejecting/discarding the tasks without completing them, or notifying the client to obtain further instructions. In some cases, the policy may be dependent on the fraction of tasks which were not completed by their latency deadlines—e.g., a different action may be initiated according to the policy if more than 2% of the tasks during a given time interval fail to meet their deadlines than if more than 5% of the tasks in the time interval fail to meet their deadlines. The policy may be stored at a metadata repository of the service, and a PolicySaved message 725 may be sent to the client in some embodiments.

Clients may request latency-related metrics for their tasks by submitting a GetLatencyMetrics request 728 in various embodiments. Metrics collected for the client's tasks over a time period, such as the fraction of tasks that were completed before their RITTs, the number of tasks of different classes (where each class may have a respective latency SLA) that were processed at the service in the time period, etc., may be provided via one or more LatencyMetrics messages 733. Other types of programmatic interactions related to latency-based scheduling than those shown in FIG. 7 may be supported by cloud-based services in some embodiments.

Figure 8:
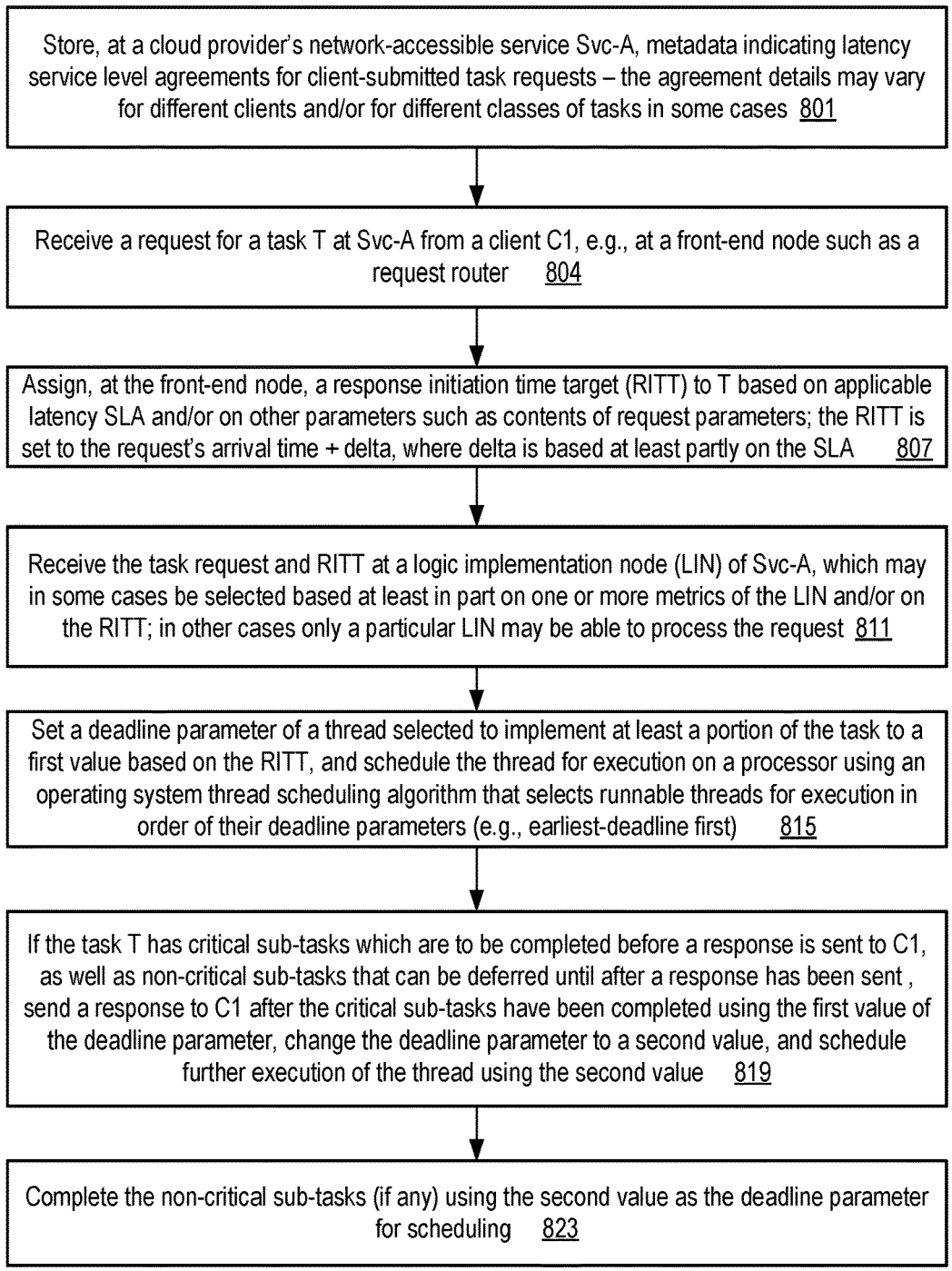
FIG. 8 is a flow diagram illustrating aspects of operations which may be performed to schedule threads at provider network services based on latency service level agreements, according to at least some embodiments.

FIG. 8 is a flow diagram illustrating aspects of operations which may be performed to schedule threads at provider network services based on latency service level agreements, according to at least some embodiments. Metadata indicating latency service level agreements for client-submitted task requests directed to a network-accessible service Svc-A of a cloud provider network may be stored at the service (element 801). The agreement details may differ from one client to another (depending on options selected by the client from a menu of SLA choices offered by the service) and/or from one category of task to another in some embodiments. In other embodiments, the same latency-related SLA may be applicable to all tasks requested by all clients.

A request for a task T may be received at Svc-A from a client C1, e.g., at a front-end node such as a request router node of Svc-A (element 804). In the embodiment shown in FIG. 8, a response initiation time target (RITT) may be assigned to the task T at the front-end node (element 807), based at least partly on the applicable latency SLA and/or on other parameters such as contents of request parameters chosen by the task request submitter. The RITT may be set to the request's arrival time plus a delta value in some implementations, where the delta value is set based at least partly on the latency SLA, and the RITT may indicate a time by which a response indicating that at least a portion of the task has been completed should be sent to the requester of the task.

In various embodiments the task request and the RITT may be sent to a back-end logic implementation node (LIN) of the service from the front-end node (element 811). The LIN may in some cases be chosen, for example, based on one or more metrics collected from the LIN (indicative of the capacity of the LIN to complete additional tasks with stringent RITTs), and/or based on the RITT itself. In some implementations, the RITT may be assigned at a LIN rather than at a front-end node of Svc-A. Note that for some types of task requests, only a single LIN may be capable of processing the tasks, so the selection of a LIN from among a set of multiple candidates may not be possible. If the task requires access to a particular data item stored at the service, and the only copy of that data item is stored at a particular LIN, for example, the task request may have to be sent to that particular LIN.

A thread of execution may be selected for performing various sub-tasks or steps of the task at the LIN in various embodiments. In some implementations, a pool of pre-created threads for implementing the business logic of Svc-A may be maintained at each LIN; in other implementations, new threads may be created as new requests are received. A deadline parameter of the selected thread may be set to a first value based at least in part on the RITT (element 815) in the depicted embodiment. At the LIN, an operating system thread scheduling algorithm that schedules runnable threads on a processor in order of increasing deadline parameter values (e.g., earliest-deadline first) may be implemented in at least some embodiments. The thread may thus be scheduled for execution on the processor (e.g., after an entry representing the thread has been placed in a processor scheduling queue whose entries are arranged in deadline order) based at least in part on the first deadline parameter value.

If the task comprises one or more critical sub-tasks which have to be completed before a response to the task request can be sent to the request submitter C1, as well as one or more non-critical sub-tasks that can be deferred until after the response is sent, the critical sub-tasks may be completed while the thread retains the first value of the deadline parameter in the depicted embodiment. Note that in order to complete the critical sub-tasks, in some cases the thread may have to be scheduled several times on the CPU (e.g., after I/O operations required for the critical sub-tasks have caused the CPU to be relinquished, or after system calls, etc.). After the critical sub-tasks have been completed, e.g., before the expiration of the RITT, a response may be sent to C1 indicating at least a portion of T has been completed (element 819). The deadline parameter of the thread may be changed to a second value (e.g., a default deadline value which is also assigned to threads working on tasks to which RITTs were not assigned), and the thread may be scheduled using the second value. The thread may then complete the remaining non-critical sub-tasks after being scheduled in accordance with the second value (element 823).

It is noted that in various embodiments, some of the operations shown in the flow diagram of FIG. 8 may be implemented in a different order than that shown in the figure, or may be performed in parallel rather than sequentially. Additionally, some of the operations shown in FIG. 8 may not be required in one or more implementations.

Figure 9:
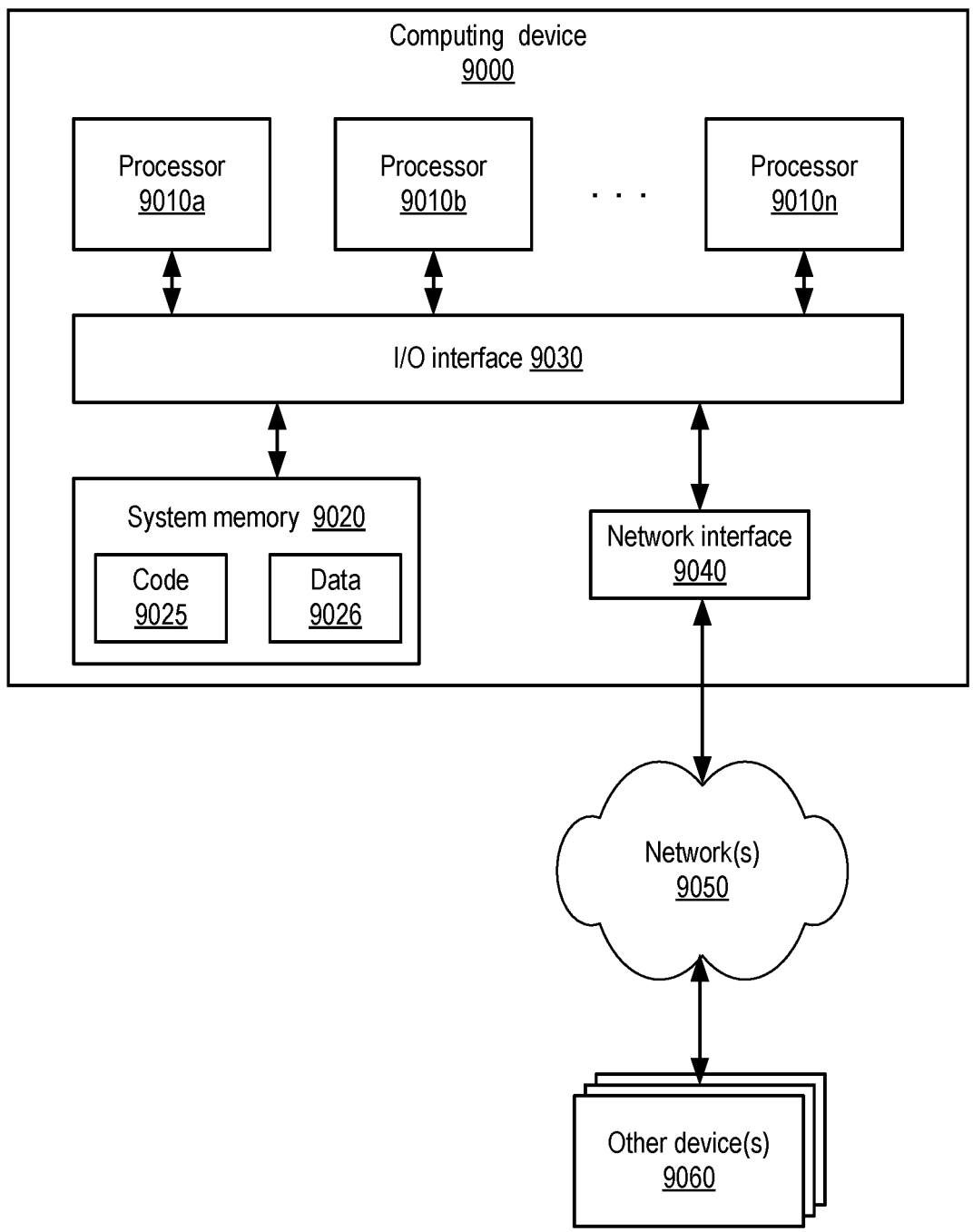
FIG. 9 is a block diagram illustrating an example computing device that may be used in at least some embodiments.

In at least some embodiments, a server that implements the types of techniques described herein (e.g., including functions of various services of a cloud provider network) may include a general-purpose computer system that includes or is configured to access one or more computer-accessible media. FIG. 9 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 9010 may commonly, but not necessarily, implement the same ISA. In some implementations, graphics processing units (GPUs) and or field-programmable gate arrays (FPGAs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses (including hardware accelerators of various kinds), such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 8, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 8. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g., SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 9 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
   one or more computing devices;
   wherein the one or more computing devices include instructions that upon execution on or across the one or more computing devices:
   receive a request for a particular task at a request router node of a network-accessible service of a provider network from a task requester;
   assign, to the particular task, a response initiation time target based at least in part on a service level agreement of the network-accessible service;
   transmit a representation of the particular task and the response initiation time target from the request router node to a service logic implementation node selected from a plurality of service logic implementation nodes of the network-accessible service to execute at least a portion of the particular task, wherein the service logic implementation node is selected based at least in part on the response initiation time target and a metric obtained from the service logic implementation node;
   set, at the service logic implementation node, a deadline parameter of a first thread identified to perform a plurality of sub-tasks of the particular task, wherein the deadline parameter is set to a first value based at least in part on the response initiation time target, and wherein the plurality of sub-tasks includes (a) a first sub-task to be completed before a response indicating successful completion of the particular task is sent to the task requester and (b) a second sub-task which is deferrable until after a response indicating successful completion of the particular task is sent to the task requester;
   schedule the first thread for execution on a processor of the service logic implementation node using an operating system thread scheduling algorithm in which runnable threads are selected for execution (a) in order of deadline parameter values and (b) without taking processing time requirements of the runnable threads into account;
   in response to determining, after the first thread is scheduled for execution on the processor in accordance with the first value, that the first sub-task has been completed no later than the response initiation time target, (a) transmit a response indicating completion of at least a portion of the particular task to the task requester and (b) set the deadline parameter to a second value; and
   complete the second sub-task after the first thread has been scheduled at the processor in accordance with the second value.

2. The system as recited in claim 1, wherein the first sub-task includes an input/output (I/O) operation directed to a storage device, wherein the one or more computing devices include further instructions that upon execution on or across the one or more computing devices:
   cause the first value of the deadline parameter to be obtained by an I/O operation scheduler of the service logic implementation node; and
   cause the I/O operation scheduler to schedule the I/O operation based at least in part on the first value.

3. The system as recited in claim 1, wherein the second sub-task comprises one or more of: (a) a logging operation, (b) a caching operation or (c) a metric reporting operation.

4. The system as recited in claim 1, wherein the network-accessible service comprises one or more of: (a) a database service, (b) an object storage service, or (c) a distributed file system service.

5. The system as recited in claim 1, wherein the one or more computing devices include further instructions that upon execution on or across the one or more computing devices:
   in response to determining that a response initiation time target has not been assigned to another task to be executed at the service logic implementation node,
   set a deadline parameter of a second thread to a default value, wherein the second thread is identified to implement at least a portion of the other task; and
   schedule the second thread for execution on the processor using the operating system thread scheduling algorithm.

6. A computer-implemented method, comprising:
   assigning, to a first task for which a request has been submitted by a task requester to a network-accessible service of a provider network, a first response initiation time target based at least in part on a service level agreement of the network-accessible service;
   setting, at a service logic implementation node of the network-accessible service, a deadline parameter of a first thread identified to perform a plurality of sub-tasks of the first task, wherein the deadline parameter is set to a first value based at least in part on the first response initiation time target, and wherein the plurality of sub-tasks includes (a) a first sub-task to be completed before a response is sent to the task requester and (b) a second sub-task which is deferrable until after a response is sent to the task requester;
   scheduling the first thread for execution on a processor of the service logic implementation node using an operating system thread scheduling algorithm in which runnable threads are selected for execution based at least in part on deadline parameter values;
   in response to determining, after the first thread is scheduled for execution on the processor in accordance with the first value, that the first sub-task has been completed no later than the first response initiation time target, (a) transmitting a response indicating completion of at least a portion of the task to the task requester and (b) setting the deadline parameter to a second value; and completing the second sub-task after the first thread has been scheduled for execution at the processor in accordance with the second value.

7. The computer-implemented method as recited in claim 6, wherein the first sub-task includes an input/output (I/O) operation directed to a storage device, the computer-implemented method further comprising:

obtaining the first value of the deadline parameter by an I/O operation scheduler of the service logic implementation node; and utilizing, by the I/O operation scheduler, at least the first value to schedule the I/O operation.

8. The computer-implemented method as recited in claim 6, wherein the second sub-task comprises one or more of: (a) a logging operation, (b) a caching operation or (c) a metric reporting operation.

9. The computer-implemented method as recited in claim 6, wherein the network-accessible service comprises one or more of: (a) a database service, (b) an object storage service, or (c) a distributed file system service.

10. The computer-implemented method as recited in claim 6, further comprising:

in response to determining that a response initiation time target has not been assigned to a second task to be executed at the service logic implementation node, setting a deadline parameter of a second thread to a default value, wherein the second thread is identified to implement at least a portion of the second task; and scheduling the second thread for execution using the operating system thread scheduling algorithm.

11. The computer-implemented method as recited in claim 6, further comprising:

in response to determining that (a) a second response initiation time target has been assigned to a second task to be executed at the service logic implementation node and (b) that the second task comprises a plurality of parallelizable sub-tasks including a first parallelizable sub-task and a second parallelizable sub-task;

setting a deadline parameter of a second thread to a third value based at least in part on the second response initiation time target, wherein the second thread is identified to implement at least a portion of the first parallelizable sub-task;

setting a deadline parameter of a third thread to the third value, wherein the third thread is identified to implement at least a portion of the second parallelizable sub-task; and scheduling the second and third threads for execution at the processor using the operating system thread scheduling algorithm.

12. The computer-implemented method as recited in claim 6, further comprising:

in response to determining that (a) a second response initiation time target has been assigned to a second task to be executed in part at the service logic implementation node and (b) that the second task includes a sub-task to be implemented at another network-accessible service, transmitting an indication of the other task and the second response initiation time target to the other network-accessible service.

13. The computer-implemented method as recited in claim 6, further comprising:

obtaining, via one or more programmatic interfaces of the network-accessible service, an indication of a client-selected policy for handling tasks for which responses have not been initiated prior to their response initiation target times; and in response to determining that a response to a request for a second task has not been initiated before a response initiation target time determined for the second task, performing an operation indicated in the client-selected policy.

14. The computer-implemented method as recited in claim 6, further comprising:

providing, via one or more programmatic interfaces of the network-accessible service, a metric indicating a fraction of tasks for which responses were provided on or before their respective response initiation target times.

15. The computer-implemented method as recited in claim 6, wherein the first response initiation time target is based at least in part on a value of a request parameter selected by the task requester.

16. One or more non-transitory computer-accessible storage media storing program instructions that when executed on or across one or more processors:

assign, to a first task for which a request has been submitted to a network-accessible service of a provider network by a task requester, a response initiation time target based at least in part on a service level agreement of the network-accessible service;

set, at a service logic implementation node of the network-accessible service, a deadline parameter of a first thread identified to perform one or more sub-tasks of the first task, wherein the deadline parameter is set to a first value based at least in part on the response initiation time target, and wherein the one or more sub-tasks include a first sub-task to be completed before a response is sent to the task requester;

schedule the first thread for execution on a processor of the service logic implementation node using an operating system thread scheduling algorithm in which runnable threads are selected for execution based at least in part on deadline parameter values; and in response to determining, after the first thread is scheduled for execution on the processor in accordance with the first value, that the first sub-task has been completed, transmit a response indicating completion of at least a portion of the task to the task requester.

17. The one or more non-transitory computer-accessible storage media as recited in claim 16, wherein the first sub-task includes an input/output (I/O) operation directed to a storage device, the one or more non-transitory computer-accessible storage media storing further program instructions that when executed on or across the one or more processors:

cause the first value of the deadline parameter to be obtained by an I/O operation scheduler of the service logic implementation node, wherein the I/O operation scheduler is configured to utilize at least the first value to schedule the I/O operation.

18. The one or more non-transitory computer-accessible storage media as recited in claim 16, wherein the first task includes a second sub-task, wherein the second sub-task is deferrable until after the response indicating completion of at least a portion of the first task is sent to the task requester, the one or more non-transitory computer-accessible storage media storing further program instructions that when executed on or across the one or more processors:
cause a particular thread to perform the second sub-task after the deadline parameter of the particular thread has been set to a second value.

19. The one or more non-transitory computer-accessible storage media as recited in claim 16, wherein the network-accessible service comprises one or more of: (a) a database service, (b) an object storage service, or (c) a distributed file system service.

20. The one or more non-transitory computer-accessible storage media as recited in claim 16, storing further program instructions that when executed on or across the one or more processors:
in response to determining that a response initiation time target has not been assigned to a second task to be executed at the service logic implementation node,
set a deadline parameter of a second thread to a default value, wherein the second thread is identified to implement at least a portion of the second task; and
schedule the second thread for execution using the operating system thread scheduling algorithm.

\* \* \* \* \*